United States Patent
Gambini et al.

(10) Patent No.: US 9,140,863 B2
(45) Date of Patent: Sep. 22, 2015

(54) FIXED CONNECTION (FC)-TYPE OPTOELECTRONIC ASSEMBLY HAVING A TRANSPARENT THREADED PLASTIC BODY WITH AN OPTICAL ELEMENT INTEGRALLY FORMED THEREIN

(75) Inventors: Piero Gambini, Turin (IT); Mario Puleo, Borgosesia (IT); Tobias Staeber, Regensburg (DE)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 830 days.

(21) Appl. No.: 13/037,651

(22) Filed: Mar. 1, 2011

(65) Prior Publication Data

US 2012/0224816 A1    Sep. 6, 2012

(51) Int. Cl.
  *G02B 6/36* (2006.01)
  *G02B 6/42* (2006.01)
  *G02B 6/38* (2006.01)

(52) U.S. Cl.
  CPC ............ *G02B 6/4292* (2013.01); *G02B 6/3894* (2013.01); *G02B 6/3897* (2013.01); *G02B 6/4263* (2013.01); *Y10T 29/49002* (2015.01)

(58) Field of Classification Search
  USPC ..................................................... 385/92, 93
  See application file for complete search history.

(56) References Cited

U.S. PATENT DOCUMENTS

| | | | |
|---|---|---|---|
| 5,495,545 A * | 2/1996 | Cina et al. ......................... | 385/92 |
| 6,795,461 B1 * | 9/2004 | Blair et al. ........................ | 372/36 |
| 6,841,799 B2 | 1/2005 | Arthur et al. | |
| 7,059,780 B2 * | 6/2006 | Yamabayashi et al. ......... | 385/88 |
| 7,215,883 B1 | 5/2007 | Lewis | |
| 7,306,377 B2 | 12/2007 | Ellison | |
| 7,309,174 B2 | 12/2007 | Farr | |
| 7,334,948 B2 | 2/2008 | Sasser et al. | |
| 2003/0095760 A1 * | 5/2003 | Lee et al. ......................... | 385/93 |

OTHER PUBLICATIONS

HFBR-0400Z,HFBR-14xxZ and HFBR-24xxZ Series Low Cost, Miniature Fiber Optic Components with ST, SMA, SC and FC Ports, Avago Technologies, Jun. 12, 2009, 25 pages.

* cited by examiner

*Primary Examiner* — Mike Stahl
*Assistant Examiner* — Kajli Prince

(57) ABSTRACT

An FC-type optoelectronic assembly is provided that has a threaded plastic body that is adapted to mate with a threaded sleeve of an FC plug by engaging the threaded sleeve the FC plug with the threaded body of the FC-type optoelectronic assembly. The threaded plastic body is transparent to an operational wavelength of the FC-type optoelectronic assembly and has an optical element integrally formed therein. A TO-can header is housed in the threaded plastic body. A miniature PCB may be used for mounting the electrical and optoelectronic components of the TO-can header assembly on the header of the TO-can header assembly.

22 Claims, 6 Drawing Sheets

FIXED CONNECTION (FC)-TYPE OPTOELECTRONIC ASSEMBLY HAVING A TRANSPARENT THREADED PLASTIC BODY WITH AN OPTICAL ELEMENT INTEGRALLY FORMED THEREIN

TECHNICAL FIELD OF THE INVENTION

The invention relates to optical receivers. More particularly, the invention relates to a Fixed Connection (FC)-type optoelectronic assembly having a threaded plastic body that is transparent to an operational wavelength of light and that has an optical element (e.g., a lens) integrally formed therein.

BACKGROUND OF THE INVENTION

Optical receivers are often implemented as transistor outline (TO)-can header assemblies. TO-can header assemblies typically include a metal cylindrical base, known as a header, four or five conductive leads having ends that pass through the header, a photodiode mounted on a mounting surface of the metal header, a receiver integrated circuit (IC) mounted on the mounting surface of the metal header, one or more passive components (e.g., capacitors, resistors, etc.) mounted on the mounting surface of the metal header, and a cap that is hermetically sealed to the metal header. The cap encases and protects the photodiode, receiver IC and other electrical devices (e.g., resistors, capacitors, etc.) mounted on the mounting surface of the header. The photodiode, the receiver IC, and the passive and/or active components that are mounted on the metal header are connected to ends of one or more of the conductive leads that pass through the metal header. A transparent window exists in the cap. An optical element (e.g., a plastic lens) is disposed between the transparent window and an end of an optical fiber attached to the TO-can header assembly to couple light passing out of the end of the optical fiber onto the photodiode.

An FC connector is a particular type of optical connector that incorporates a TO-can header assembly. The FC connector has been standardized in FOCIS 4 (Fiber Optic Connector Intermateability Standards (FOCIS) 4 of Electrical Industries Alliance/Telecommunications Industry Association (EIA/TIA)-604-04. In an FC connector, the TO-can header assembly is housed within a metal receptacle that has a threaded outer surface. The FC connector is designed to mate with an FC plug that holds an end of an optical fiber within a ferrule. The FC plug has a metal sleeve that is threaded on its inner surface and that can be moved from a rearward position to a forward position. In order to mate the FC plug with the FC connector, the end of the FC plug is inserted into the receptacle of the FC connector. The metal sleeve of the plug is then moved from the rearward position to the forward position over the threaded outer surface of the FC connector and rotated in the clockwise direction to cause the threads on the inner surface of the sleeve to engage the threads on the outer surface of the receptacle. In this way, the FC plug is securely attached to the FC connector.

When the FC connector is implemented as an optical receiver, the electrical and optoelectronic components of the receiver are typically directly attached to the mounting surface of the metal header. If passive or active electrical components are needed, they are typically implemented as chips that are die attached by a metallic (e.g., gold) bonding material to the mounting surface of the metal header and then wire bonded to one or more of the conductive leads. The die attachment and wire bonding processes are relatively expensive and time consuming to perform. Consequently, these processes increase manufacturing costs. It would be desirable to provide an FC-type optoelectronic assembly that obviates the need to perform these processes for passive and/or active electrical components used in the FC connector. It would also be desirable to provide and FC connector that is generally easier and less costly to manufacture.

SUMMARY OF THE INVENTION

The invention is directed to an FC-type optoelectronic assembly and a method. The FC-type optoelectronic assembly comprises a molded plastic body that is transparent to an operational wavelength of light, a TO-can header assembly housed in the molded plastic body, and an optical element disposed above a header of the TO-can header assembly and integrally formed in the molded plastic body. The molded plastic body has a front FC-type connector portion and a back portion. At least the front FC-type connector portion has an exterior surface that is threaded for mating with a threaded sleeve of an FC plug.

The method comprises providing an FC-type optoelectronic assembly, providing an FC plug, and engaging the FC-type optoelectronic assembly with the FC plug to mate the FC-type optoelectronic assembly with the FC plug. The FC-type optoelectronic assembly comprises a molded plastic body, a TO-can header assembly, and an optical element integrally formed in the molded plastic body. The molded plastic body is transparent to an operational wavelength of light. The molded plastic body has a front FC-type connector portion and a back portion. At least the front FC-type connector portion has an exterior surface that is threaded for mating with a threaded sleeve of an FC plug. The TO-can header assembly is housed in the back portion of the molded plastic body. The TO-can header assembly includes at least a header having a front surface and a back surface and a plurality of electrically-conductive leads having ends that are connected to the header. The FC plug comprises a ferrule having an end of an optical fiber secured therein and having a sleeve that has a threaded inner surface. The threaded exterior surface of the front FC-type connector portion is engaged with the threaded inner surface of the sleeve of the FC plug.

These and other features and advantages of the invention will become apparent from the following description, drawings and claims.

DETAILED DESCRIPTION OF AN ILLUSTRATIVE EMBODIMENT

In accordance with the invention, an FC-type optoelectronic assembly is provided that has a threaded plastic body that is adapted to mate with an FC plug by engaging the threaded sleeve of the FC plug with the threaded body of the FC-type optoelectronic assembly. A TO-can header assembly is housed in the threaded plastic body. The threaded plastic body is transparent to an operational wavelength of light. An optical element (e.g., a lens) is integrally formed in the plastic body of the FC-type optoelectronic assembly. Electrical and optoelectronic components of the TO-can header assembly preferably are mounted on a circuit board, such as a miniature printed circuit board (PCB), which, in turn, is mounted on the header of the TO-can header assembly.

Providing the FC-type optoelectronic assembly with a threaded plastic body has several advantages. One advantage is that it allows the optical element (e.g., a lens) to be integrally formed in the threaded plastic body. While FC-type connectors that are made of molded plastic are known in the industry, such connectors are not transparent to the operating wavelength of light and have optical elements that are not integral parts of the connector bodies. Making the molded plastic body transparent and integrally forming the optical element therein makes the manufacturing process easier, less time consuming, and less expensive to perform than it would be if a separate optical element were used.

An advantage of using the miniature PCB is that the aforementioned die attachment and wire bonding processes can be avoided. Rather than die attaching passive and/or active components to a metal header surface, the passive and/or active components of the FC-type optoelectronic assembly are attached to the miniature PCB. Electrical connections are then made between electrical contacts of the miniature PCB and the ends of the leads. Using the miniature PCB reduces overall manufacturing costs because it is easier and less expensive to make the miniature PCB and to attach it to the header than it would be to die attach multiple chips to a header and wire bond them to the leads of the TO-can header assembly. These and other features and advantages will now be described with reference to the figures. Like numerals in the figures represent like elements or features.

Figure 1:
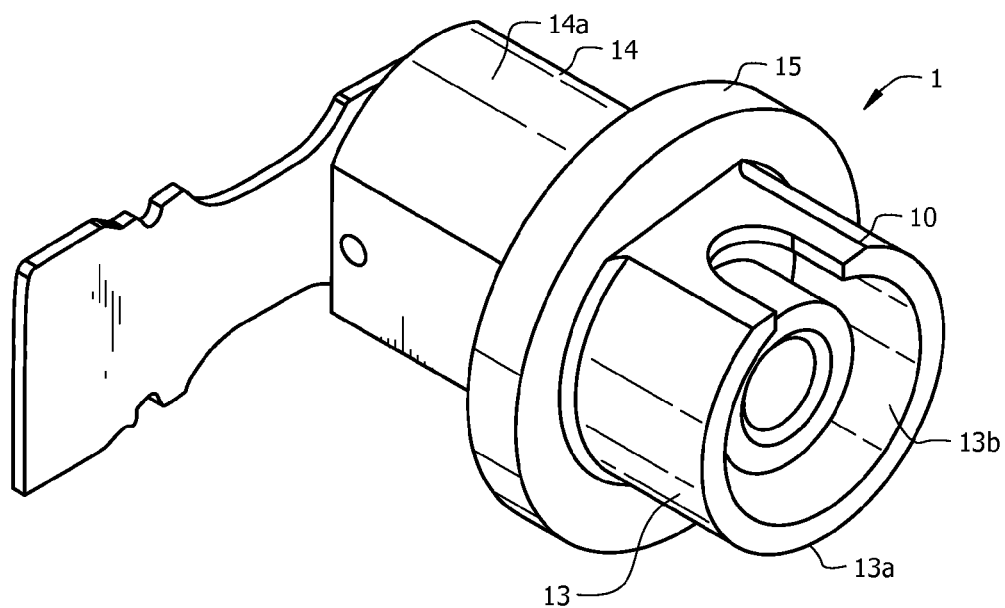
FIG. 1 illustrates a front perspective view of an FC-type optoelectronic assembly in accordance with an illustrative, or exemplary, embodiment.

FIG. 1 illustrates a front perspective view of an FC-type optoelectronic assembly 1 in accordance with an illustrative, or exemplary, embodiment. The FC-type optoelectronic assembly 1 has a molded plastic body 10 comprising a front FC-type connector portion 13, a back portion 14, and a flange 15. The molded plastic body 10 is transparent to an operational wavelength of light. The term "transparent", as that term is used herein, means that light of the operational wavelength of the FC-type optoelectronic assembly 1 can pass through the body 10. The front FC-type connector portion 13 has an exterior surface 13a and an interior surface 13b. The exterior surface 13a of the front FC-type connector portion 13 is threaded, although the threads are not visible in FIG. 1. The back portion 14 has an exterior surface 14a and an interior surface (not shown).

Figure 2:
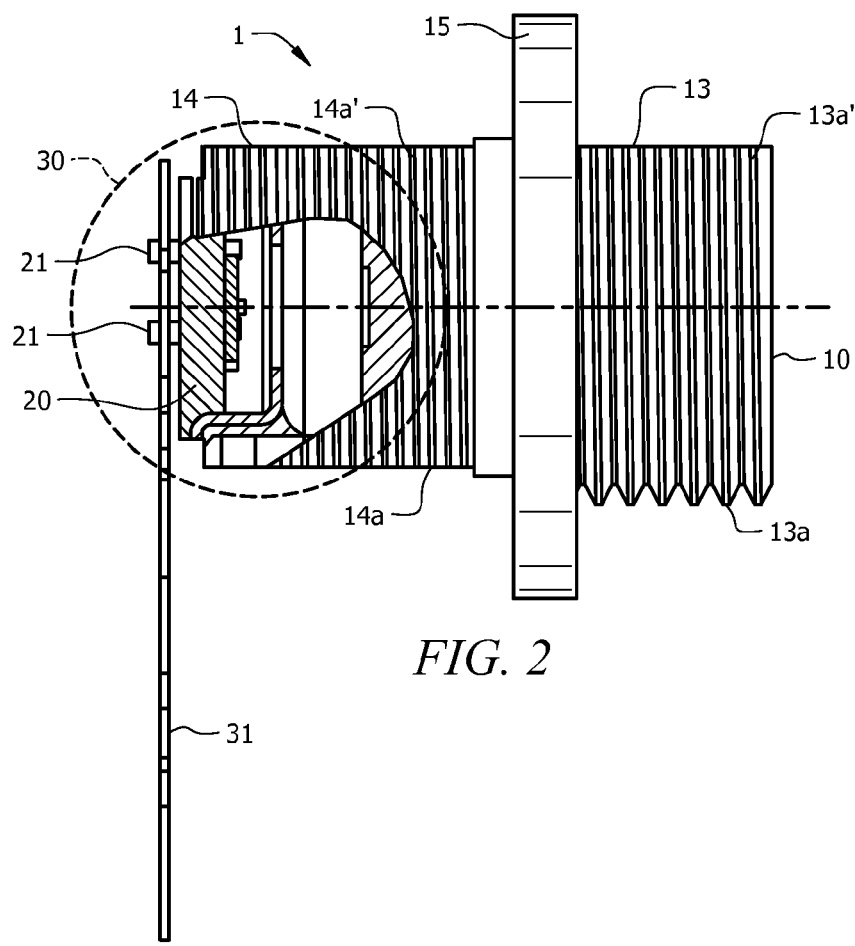
FIG. 2 illustrates a side plan view of an FC-type optoelectronic assembly shown in FIG. 1 with a portion of the back portion of the molded plastic body removed to reveal a TO-can header assembly disposed within the interior of the back portion.

FIG. 2 illustrates a side plan view of the FC-type optoelectronic assembly 1 shown in FIG. 1 with a portion of the back portion 14 of the molded plastic body 10 removed to reveal a TO-can header assembly 20 disposed within the interior of the back portion 14. The exterior surface 13a of the front FC-type connector portion 13 of the molded plastic body 10 has threads 13a' thereon for engaging threads (not shown) of a sleeve (not shown) of an FC plug (not shown) adapted to mate with the FC-type optoelectronic assembly 1. In accordance with this illustrative embodiment, the back portion 14 of the molded plastic body 10 has threads 14a' on its exterior surface 14a that are used for mounting purposes, as will be described below with reference to FIGS. 5A and 5B.

Figure 3:
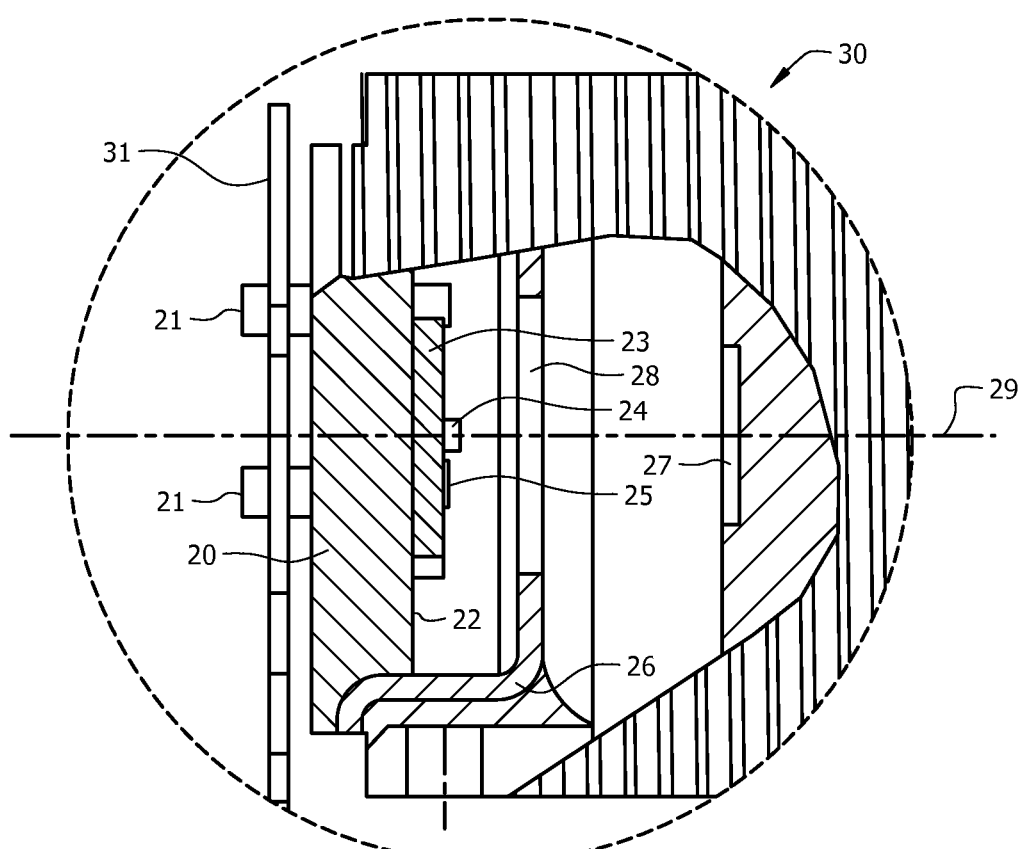
FIG. 3 illustrates an expanded side plan view of the portion of the FC-type optoelectronic assembly shown in FIG. 2.

FIG. 3 illustrates an expanded side plan view of the portion 30 of the FC-type optoelectronic assembly 1 shown in FIG. 2. In the side plan view shown in FIG. 3, a section of the back portion 14 of the molded plastic body 10 has been removed to reveal the TO-can header assembly 20 of the FC-type optoelectronic assembly 1. The TO-can header assembly 20 may be a standard TO-can header assembly that includes a mounting surface 22 and the plurality of electrically-conductive leads 21, which pass through the mounting surface 22. A miniature PCB 23 is attached to the mounting surface 22. A photodiode 24 and at least one passive electrical component 25 are mounted on the miniature PCB 23. A cap 26 at least partially encapsulates the TO-can header assembly 20. An optical element (e.g., a lens) 27 is integrally formed in the molded plastic body 10. A window 28 is formed in the cap 26 to allow light passing out of the end of an optical fiber (not shown) to be coupled by the optical element 27 onto the photodiode 24. An alternative to having the window 28 formed in the cap 26 is to make the cap 26 of a material that is transparent to the operating wavelength of the photodiode 24. The optical element 27 and the photodiode 24 are positioned along an optical axis 29 of the FC-type optoelectronic assembly 1. The electrically-conductive leads 21 are connected to a flexible circuit (flex circuit) 31, which is optional.

The photodiode 24, the passive component 25 and any other necessary or desired electrical components (not shown) may be mounted on the miniature PCB 23 at a panel level in which a panel (not shown) comprising a plurality of the miniature PCBs 23 is populated with these components and then diced to separate the miniature PCBs 23 from the panel. This feature allows for high-volume production of the miniature PCBs 23, which reduces the overall cost and complexity associated with manufacturing the FC-type optoelectronic assembly 1. The molded plastic body 10 is made of an optical-grade plastic material to allow the optical element 27 to be integrally formed therein on an optical axis 29 of the FC-type optoelectronic assembly 1. As indicated above, making the FC-type optoelectronic assembly 1 of molded plastic further reduces the costs associated with manufacturing the FC-type optoelectronic assembly 1.

Figure 4:
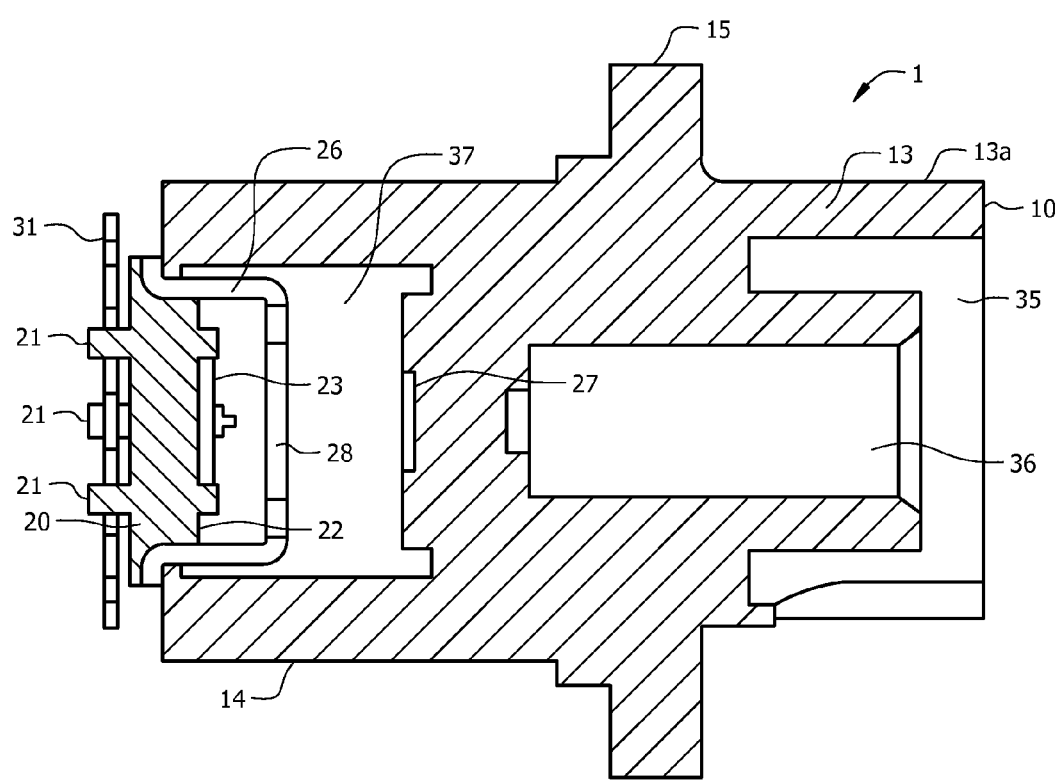
FIG. 4 illustrates a cross-sectional side view of the FC-type optoelectronic assembly shown in FIG. 2.

FIG. 4 illustrates a cross-sectional side view of the FC-type optoelectronic assembly 1 shown in FIG. 2. The molded plastic body 10 has a first opening 35 formed in the front FC-type connector portion 13 for receiving an end of an FC plug (not shown). A second opening 36 is formed in the front FC-type connector portion 13 for receiving a ferrule (not shown) of the FC plug (not shown). The back portion 14 of the molded plastic body 10 has an opening 37 formed therein for receiving the TO-can header assembly 20. The FC plug (not shown) may be a standard FC plug adapted to mate with a standard FC connector. The FC plug mates with the front FC-type connector portion 13 in the same manner as described above in the description of the known FC connector, i.e., the threaded inner surface of the sleeve (not shown) of the FC plug (not shown) engages the threaded outer surface 13a of the front FC-type connector portion 13 of the molded plastic body 10.

Figure 5A:
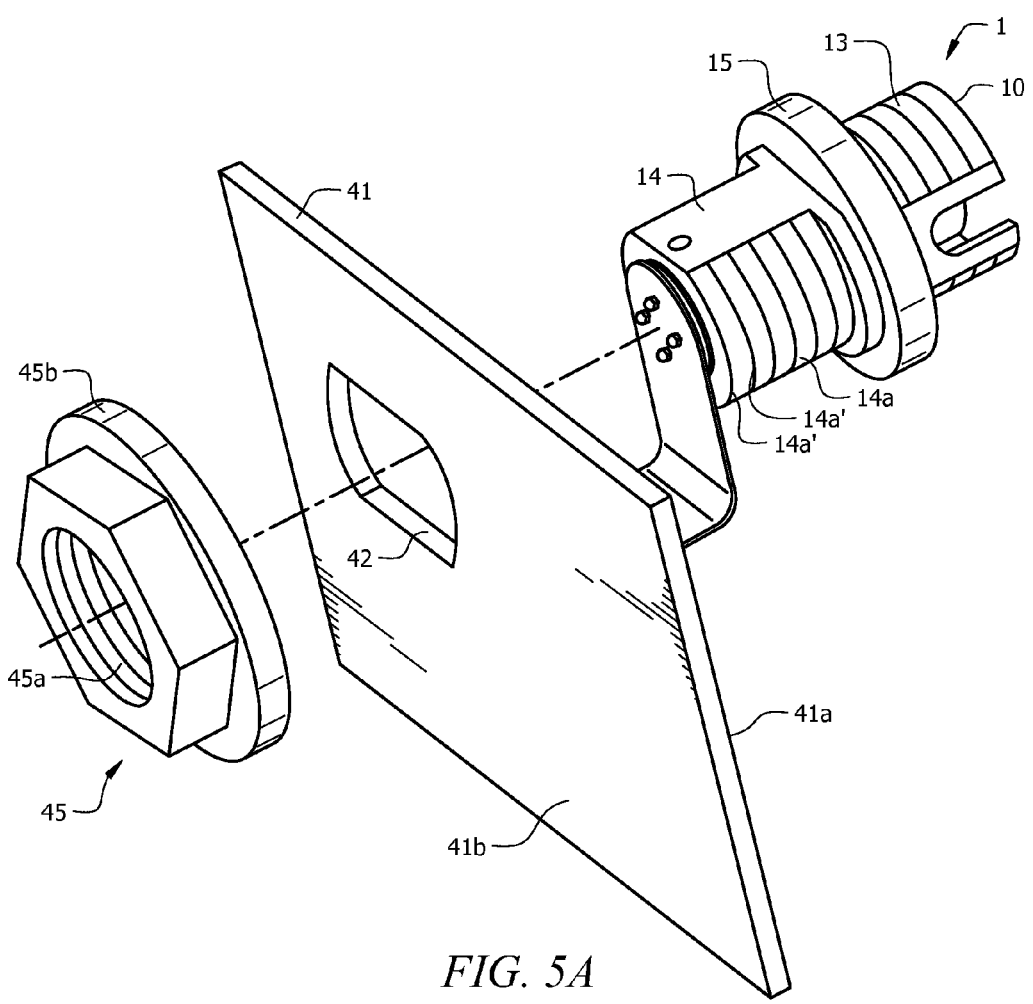
FIGS. 5A and 5B illustrate back perspective views of the FC-type optoelectronic assembly just prior to and just after, respectively, being mounted to a panel.
Figure 5B:
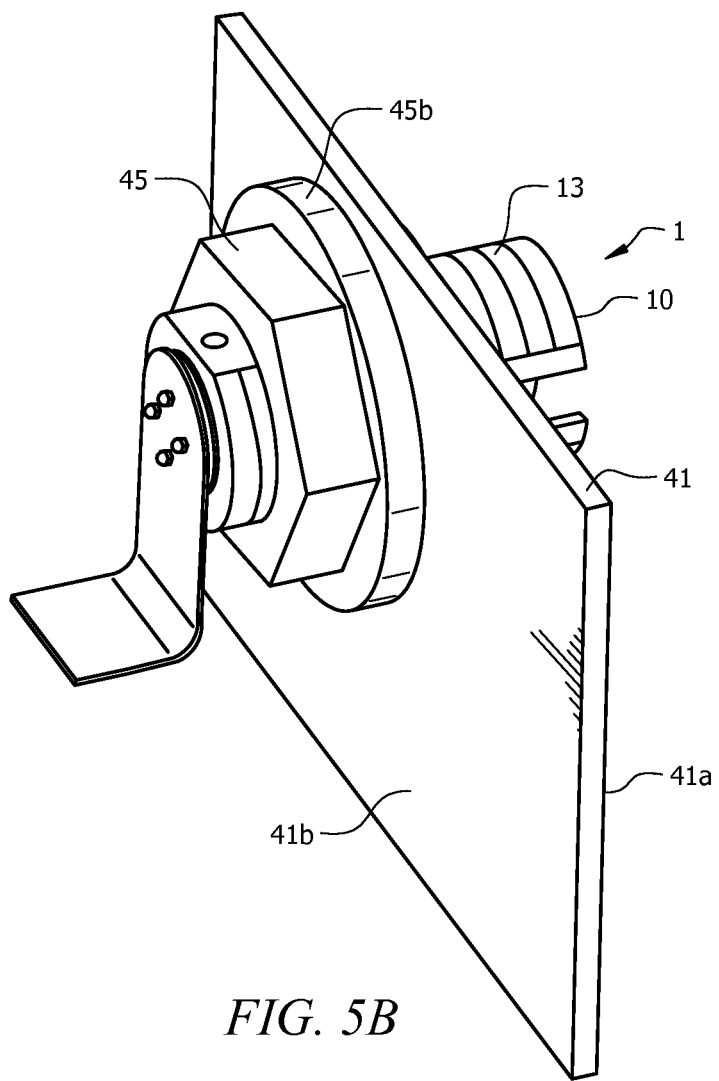

FIGS. 5A and 5B illustrate back perspective views of the FC-type optoelectronic assembly 1 just prior to and just after, respectively, being mounted to a panel 41. The panel 41 has an opening 42 in it through which the back portion 14 of the molded plastic body 10 is inserted. When the back portion 14 is fully inserted through the opening 42, the flange 15 of the molded plastic body 10 is in abutment with a front side 41a of the panel 41. A fastening nut 45 that has inner threads 45a and a flange 45b is then fastened to the back portion 14 such that the inner threads 45a engage the threads 14a: of the back portion 14. When the threads 45a and 14a: are fully engaged, the flange 45b is in abutment with a back side 41b of the panel 41, as shown in FIG. 5B.

Figure 6A:
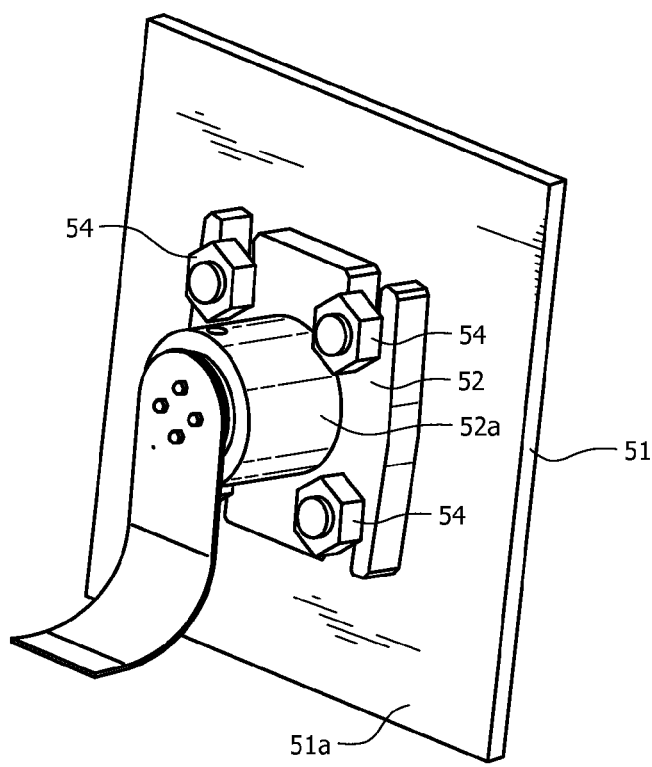
FIGS. 6A and 6B illustrate front and back perspective views, respectively, of the FC-type optoelectronic assembly secured to a panel via a mounting configuration that is different from that shown in FIGS. 5A and 5B.
Figure 6B:
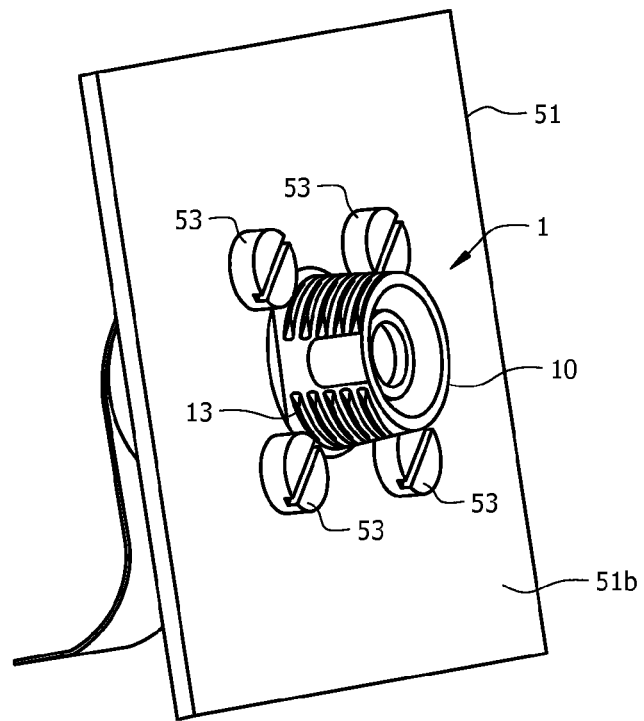

FIGS. 6A and 6B illustrate front and back perspective views, respectively, of the FC-type optoelectronic assembly 1 secured to a panel 51 via a mounting configuration that is different from that shown in FIGS. 5A and 5B. Rather than using the fastening nut 45 shown in FIGS. 5A and 5B, a mounting receptacle 52 is attached to a back side 51a of the panel 51 for receiving the back portion 14 of the molded plastic body 10 through an opening (not shown) formed in the panel 51. The mounting receptacle 52 is mounted to the panel 51 by four screws 53 and four nuts 54, as shown in FIGS. 6A and 6B. The mounting receptacle 52 has a threaded bore 52a that engages the threaded back portion 14 of the molded plastic body 10.

It should be noted that while the FC-type optoelectronic assembly of the invention has been described with reference to having a front FC-type connector portion 13, the front FC-type connector portion 13 need not meet all of the requirements set forth in industry standards that govern FC connectors. As will be understood by persons skilled in the art, the front FC-type connector portion 13 will typically, but not necessarily, meet such standards since it is intended to mate with a standard FC plug. However, as will also be understood by those skilled in the art, modifications to the front FC-type connector portion 13 that are not contained in standards may be made without deviating from the scope of the invention.

It should also be noted that although the FC-type optoelectronic assembly 1 has been described as an optical receiver, it may instead be configured as an optical transmitter or as an optical transceiver. In the case of an optical transmitter, the photodiode 24 would be replaced by a laser diode (not shown) and the laser diode and a laser diode driver IC (not shown) would be mounted on the miniature PCB 23. In the case of an optical transceiver, the photodiode 24, the electrical component 25, the laser diode, the laser diode driver IC, and possibly other components, will be mounted on the PCB 23. In the case of an optical transceiver, a second optical element (e.g., a lens) will typically be integrally formed in the transparent molded plastic body 10.

It should be noted that the invention has been described with reference to a few illustrative, or exemplary, embodiments for the purposes of demonstrating the principles and concepts of the invention. Those of ordinary skill in the art will understand that the invention is not limited to these embodiments. For example, the connector is not limited to mounting arrangements such as those shown in FIGS. 5A-6B. Also, while the back portion of the molded plastic body is shown as being threaded, this is only for mounting purposes. It is not necessary in all cases for the back portion of the molded plastic body to be threaded. As will be understood by persons of ordinary skill in the art, modifications may be made to the embodiments described above with reference to FIGS. 1-6B, and all such modifications are within the scope of the invention.

What is claimed is:

1. A fixed connection (FC)-type optoelectronic assembly comprising:
    a single-piece molded plastic body having a front FC-type connector portion and a back portion separated from the front FC-type connector portion by a flange extending from an outer surface of the single-piece molded plastic body, at least the front FC-type connector portion having an exterior surface that is threaded for mating with a threaded sleeve of an FC plug, the single-piece molded plastic body being made of a plastic material that is transparent to an operational wavelength of the FC-type optoelectronic assembly, wherein the flange is adapted to engage an outer surface of a panel when the FC-type optoelectronic assembly is mounted to the panel;
    a transistor outline (TO)-can header assembly housed in the back portion of the single-piece molded plastic body, the TO-can header assembly including at least a header having a front surface and a back surface and a plurality of electrically-conductive leads having ends that are connected to the header; and
    an optical element integrally formed in the single-piece molded plastic body and disposed above the header.

2. The FC-type optoelectronic assembly of claim 1, further comprising:
    a circuit board mounted on the front surface of the header, the circuit board having at least one electrical component and at least one optoelectronic component mounted thereon and electrically connected to the circuit board, the circuit board having electrical contacts thereon that are connected to one or more of the electrically-conductive leads.

3. The FC-type optoelectronic assembly of claim 2, wherein said at least one optoelectronic component includes at least one photodiode.

4. The FC-type optoelectronic assembly of claim 2, wherein said at least one optoelectronic component includes at least one laser diode.

5. The FC-type optoelectronic assembly of claim 2, wherein said at least one optoelectronic component includes at least one photodiode and at least one laser diode.

6. The FC-type optoelectronic assembly of claim 2, wherein said at least one of the electrical component includes a passive component.

7. The FC-type optoelectronic assembly of claim 1, wherein the back portion has an exterior surface that is threaded for mating with a threaded mounting device, such that when FC-type optoelectronic assembly is mounted to the panel the threaded device engages the threaded exterior surface of the back portion and a flange of the threaded mounting device engages a second surface of the panel opposite the surface of the panel engaged by the flange of the single-piece molded plastic body.

8. The FC-type optoelectronic assembly of claim 1, further comprising:
    an FC plug comprising a ferrule having an end of an optical fiber secured therein and having a sleeve that has a threaded inner surface, the threaded exterior surface of the front FC-type connector portion being engaged with the threaded inner surface of the sleeve of the FC plug to cause the FC connector to be mated with the FC plug.

9. A method for using a fixed connection (FC)-type optoelectronic assembly, the method comprising:
    providing an FC-type optoelectronic assembly comprising:
        a single-piece molded plastic body having a front FC-type connector portion and a back portion separated from the front FC-type connector portion by a flange extending from an outer surface of the single-piece molded plastic body, at least the front FC-type connector portion having an exterior surface that is threaded for mating with a threaded sleeve of an FC plug, the single-piece molded plastic body being made of a plastic material that is transparent to an operational wavelength of the FC-type optoelectronic assembly, wherein the flange is adapted to engage an outer surface of a panel when the FC-type optoelectronic assembly is mounted to the panel; and a transistor outline (TO)-can header assembly housed in the opening of the back portion of the single-piece molded plastic body, the TO-can header assembly including at least a header having a front surface and a back surface and a plurality of electrically-conductive leads having ends that are connected to the header; and an optical element integrally formed in the single-piece molded plastic body and disposed above the header;

providing an FC plug comprising a ferrule having an end of an optical fiber secured therein and having a sleeve that has a threaded inner surface; and engaging the threaded exterior surface of the front FC-type connector portion with a threaded inner surface of the sleeve of the FC plug to cause the front FC-type connector portion to be mated with the FC plug.

10. The method of claim 9, wherein the FC-type optoelectronic assembly further comprises a circuit board mounted on the front surface of the header, the circuit board having at least one electrical component and at least one optoelectronic component mounted thereon and electrically connected to the circuit board, the circuit board having electrical contacts thereon that are connected to one or more of the electrically-conductive leads.

11. The method of claim 10, wherein said at least one optoelectronic component includes at least one photodiode.

12. The method of claim 10, wherein said at least one optoelectronic component includes at least one laser diode.

13. The method of claim 10, wherein said at least one optoelectronic component includes at least one photodiode and at least one laser diode.

14. The method of claim 10, wherein said at least one of the electrical component includes a passive component.

15. A fixed connection (FC)-type optoelectronic assembly comprising:

an integrally-formed single-piece plastic body having a front FC-type connector portion and a back portion separated from the front FC-type connector portion by a flange extending from an outer surface of the integrally-formed single-piece plastic body, at least the front FC-type connector portion having an exterior surface that is threaded for mating with a threaded sleeve of an FC plug, the integrally-formed single-piece plastic body being made of a plastic material that is transparent to an operational wavelength of the FC-type optoelectronic assembly, wherein the flange is adapted to engage an outer surface of a panel when the FC-type optoelectronic assembly is mounted to the panel;

a transistor outline (TO)-can header assembly housed in the back portion of the plastic body, the TO-can header assembly including at least a header having a front surface and a back surface and a plurality of electrically-conductive leads having ends that are connected to the header; and an optical element integrally formed in the plastic body and disposed above the header.

16. The FC-type optoelectronic assembly of claim 15, further comprising:

a circuit board mounted on the front surface of the header, the circuit board having at least one electrical component and at least one optoelectronic component mounted thereon and electrically connected to the circuit board, the circuit board having electrical contacts thereon that are connected to one or more of the electrically-conductive leads.

17. The FC-type optoelectronic assembly of claim 16, wherein said at least one optoelectronic component includes at least one photodiode.

18. The FC-type optoelectronic assembly of claim 16, wherein said at least one optoelectronic component includes at least one laser diode.

19. The FC-type optoelectronic assembly of claim 16, wherein said at least one optoelectronic component includes at least one photodiode and at least one laser diode.

20. The FC-type optoelectronic assembly of claim 16, wherein said at least one of the electrical component includes a passive component.

21. The FC-type optoelectronic assembly of claim 15, wherein the back portion has an exterior surface that is threaded for mating with a threaded mounting device, such that when FC-type optoelectronic assembly is mounted to the panel the threaded device engages the threaded exterior surface of the back portion and a flange of the threaded mounting device engages a second surface of the panel opposite the surface of the panel engaged by the flange of the integrally-formed single-piece plastic body.

22. The FC-type optoelectronic assembly of claim 15, further comprising:

an FC plug comprising a ferrule having an end of an optical fiber secured therein and having a sleeve that has a threaded inner surface, the threaded exterior surface of the front FC-type connector portion being engaged with the threaded inner surface of the sleeve of the FC plug to cause the FC connector to be mated with the FC plug.

* * * * *